United States Patent
Sohizad et al.

(10) Patent No.: US 9,254,785 B2
(45) Date of Patent: Feb. 9, 2016

(54) EXTRUDED LIGHT PIPE CARRIER

(71) Applicant: Ford Global Technologies, LLC, Dearborn, MI (US)

(72) Inventors: Ben Sohizad, Novi, MI (US); Ali Ammar, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 13/908,416

(22) Filed: Jun. 3, 2013

(65) Prior Publication Data

US 2014/0226353 A1    Aug. 14, 2014

Related U.S. Application Data

(60) Provisional application No. 61/764,741, filed on Feb. 14, 2013.

(51) Int. Cl.
| | |
|---|---|
| *F21V 9/00* | (2015.01) |
| *B60Q 3/00* | (2006.01) |
| *B60Q 3/02* | (2006.01) |
| *F21V 21/088* | (2006.01) |
| *F21V 8/00* | (2006.01) |

(52) U.S. Cl.
CPC ............. *B60Q 3/002* (2013.01); *B60Q 3/004* (2013.01); *B60Q 3/0216* (2013.01); *B60Q 3/0289* (2013.01); *F21V 21/088* (2013.01); *G02B 6/001* (2013.01); *Y10T 29/49826* (2015.01)

(58) Field of Classification Search
CPC ...... B60Q 3/002; B60Q 3/004; B60Q 3/0216; F21V 21/088

USPC .......... 362/551, 555, 581, 511, 501
See application file for complete search history.

(56) References Cited

U.S. PATENT DOCUMENTS

| | | | |
|---|---|---|---|
| 4,788,630 A | | 11/1988 | Gavagan |
| 5,193,895 A | * | 3/1993 | Naruke et al. ............ 362/542 |
| 5,659,643 A | * | 8/1997 | Appeldorn ............ G02B 6/001 362/551 |
| 5,709,448 A | | 1/1998 | Jennings et al. |
| 5,799,124 A | * | 8/1998 | Zorn et al. .................... 385/125 |

(Continued)

FOREIGN PATENT DOCUMENTS

| | | |
|---|---|---|
| DE | 102007058272 | 6/2009 |
| WO | 03081300 | 10/2003 |

OTHER PUBLICATIONS

AutoZone. "Pilot Automotive/LED Light Bar." Printed Apr. 3, 2013. http://www.autozone.com/autozone/accessories/Pilot-Automotive-LED-light-bar/_/N-6geb?itemIdentifier=329497_0_0_. 3 pages.

(Continued)

*Primary Examiner* — Ali Alavi
(74) *Attorney, Agent, or Firm* — Vichit Chea; Price Heneveld LLP

(57) ABSTRACT

A lighting apparatus for a vehicle includes a light source and a light pipe. The light pipe has a first end coupled with the light source, a second end, and a side surface extending between the first and second ends for radially emitting light. A carrier surrounds the side surface and includes an opaque portion and a translucent portion. The opaque portion abuts the side surface for preventing light from emitting beyond the side surface. The translucent portion extends adjacent to the opaque portion.

18 Claims, 4 Drawing Sheets

(56) References Cited

U.S. PATENT DOCUMENTS

| | | | |
|---|---|---|---|
| 5,857,758 A * | 1/1999 | Dealey, Jr. | B60Q 3/004 |
| | | | 362/223 |
| 5,982,969 A * | 11/1999 | Sugiyama et al. | 385/123 |
| 6,095,673 A * | 8/2000 | Goto et al. | 362/582 |
| 6,123,442 A * | 9/2000 | Freier et al. | 362/559 |
| 6,152,586 A * | 11/2000 | Dealey et al. | 362/485 |
| 6,238,075 B1 | 5/2001 | Dealey, Jr. et al. | |
| 6,275,644 B1 * | 8/2001 | Domas | G02B 6/0005 |
| | | | 362/551 |
| 6,550,952 B1 * | 4/2003 | Hulse et al. | 362/555 |
| 6,637,924 B2 * | 10/2003 | Pelka et al. | 362/555 |
| 6,641,290 B2 * | 11/2003 | Ishiharada | 362/495 |
| 6,854,869 B1 | 2/2005 | Fernandez | |
| 6,880,959 B2 * | 4/2005 | Houston | 362/511 |
| 6,883,931 B2 * | 4/2005 | Tufte | 362/223 |
| 7,228,052 B1 * | 6/2007 | Lin | 385/146 |
| 7,416,320 B2 | 8/2008 | Sakiyama et al. | |
| 7,512,300 B2 * | 3/2009 | Robertson et al. | 385/101 |
| 7,549,783 B2 * | 6/2009 | Cassarly et al. | 362/559 |
| 8,162,519 B2 | 4/2012 | Salter et al. | |
| 8,459,854 B2 * | 6/2013 | Rudek et al. | 362/581 |
| 2003/0002273 A1 | 1/2003 | Anderson, Jr. et al. | |
| 2006/0181896 A1 | 8/2006 | Lin | |
| 2009/0290367 A1 * | 11/2009 | Iwai et al. | 362/488 |
| 2010/0277946 A1 * | 11/2010 | Shallcross et al. | 362/581 |
| 2010/0296302 A1 * | 11/2010 | Welch et al. | 362/471 |
| 2012/0043677 A1 | 2/2012 | Frankiewicz et al. | |
| 2012/0224390 A1 | 9/2012 | Rivera et al. | |

OTHER PUBLICATIONS

A L. Harmer, "Fibre Optics in Automobiles", Proc. SPIE 0468, Fibre Optics '84, 174, Aug. 15, 1984.

\* cited by examiner

EXTRUDED LIGHT PIPE CARRIER

CROSS REFERENCE TO RELATED APPLICATION

The present application claims the benefit under 35 USC §119(e) of provisional application Ser. No. 61/764,741, filed Feb. 14, 2013, entitled EXTRUDED LIGHT PIPE CARRIER, the entire contents of which are incorporated herein by reference.

FIELD OF THE INVENTION

This invention generally relates to a light pipe lighting apparatus, and more specifically to a lighting apparatus having an extruded carrier.

BACKGROUND OF THE INVENTION

It is becoming more common to provide lighting assemblies on vehicles for specialty lighting or accent lighting, especially on interior surfaces of vehicle passenger compartments. With the inclusion of lighting assemblies on modern vehicles interiors, it is increasingly important for the lighting assemblies and surrounding vehicle components to be designed and assembled to avoid light loss into undesired areas, such as beneath trim panels that may leak light through surrounding seams or other spaces. As specialty and accent lighting is desired in more discrete locations, this problem may be increased.

SUMMARY OF THE INVENTION

According to one aspect of the present invention, a vehicle lighting apparatus includes a light source and a light pipe. The light pipe has a first end coupled with the light source, a second end, and a side surface extending between the first and second ends for radially emitting light. A carrier surrounds the side surface and comprises an opaque portion and a translucent portion. The opaque portion abuts the side surface for preventing light from emitting beyond the side surface. The translucent portion is adjacent to the opaque portion.

According to another aspect of the present invention, a vehicle lighting apparatus includes an optical fiber having a first end, a second end, and a side surface extending there between for emitting light received from the first end. An elastomeric carrier engages the side surface and includes an opaque portion. The opaque portion longitudinally extending along a first circumferential segment of the side surface and has a flange protruding laterally for engaging a vehicle surface.

According to yet another aspect of the present invention, a method of forming a lighting apparatus includes providing a light pipe having a first end, a second end, and a side surface there between for emitting light received from at least one of the first and second ends. A carrier is extruded on the side surface of the light pipe. The carrier includes a translucent portion and an opaque portion that are co-extruded adjacent each other around the side surface of the light pipe.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 2A is a cross-sectional side view of the lighting apparatus taken at line IIA-IIA of FIG. 2;

DETAILED DESCRIPTION OF THE PREFERRED EMBODIMENTS

Figure 1:
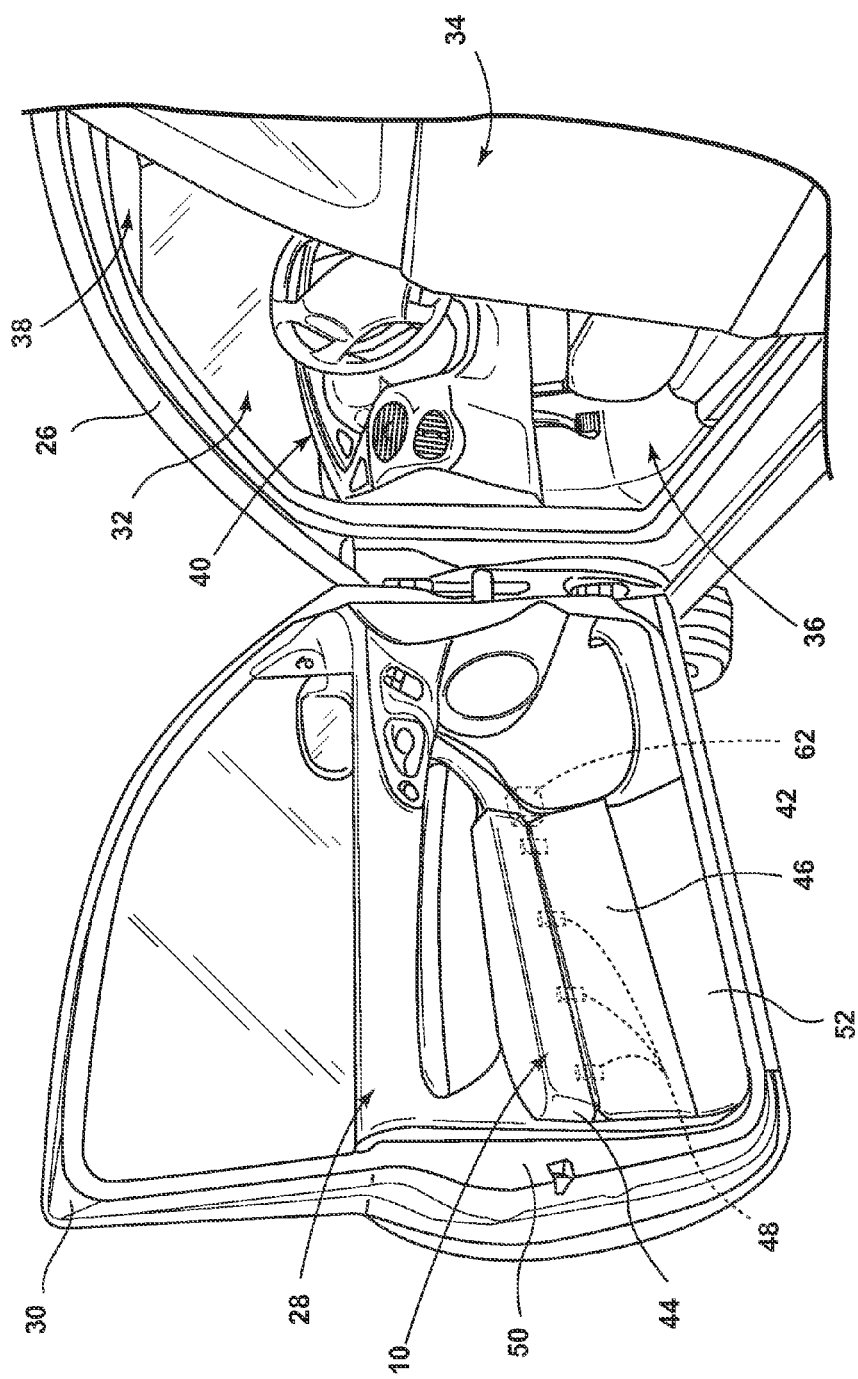
FIG. 1 is a top perspective view of a vehicle having a door in an open position having a lighting apparatus, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring generally to FIGS. 1-4, reference numeral 10 generally designates a lighting apparatus that includes a light pipe 12. The light pipe 12 includes a first end 14, a second end 16, and a side surface 18 extending between the first and second ends 14, 16 for emitting light received from a light source at at least one of the first and second ends 14, 16. A carrier 20 is extruded over the side surface 18 and includes a translucent portion 22 and an opaque portion 24. The translucent portion 22 longitudinally extends on the side surface 18. The opaque portion 24 is disposed adjacent to the translucent portion 22 for preventing light from emitting beyond the side surface 18.

As shown in FIG. 1, one embodiment of the lighting apparatus 10 is included on an interior surface of a vehicle 26. More specifically, the illustrated lighting apparatus 10 is coupled with an interior side 28 of a door 30 of the vehicle 26. It is understood that the lighting apparatus 10 may be positioned in various locations throughout an interior passenger compartment 32 or an exterior 34 the vehicle 26 other that the illustrated position, such as a foot well location 36, a headliner location 38, and a dashboard location 40, among other conceivable locations. It is also contemplated that the vehicle 26 may include various vehicle types other than the illustrated automobile 26, including airplanes, boats, trains, and other vehicles as generally understood in the art.

As also illustrated in FIG. 1, the door 30 of the vehicle has a seam 42 separating a first interior trim panel 44 and a second interior trim panel 46. A plurality of retention clips 48 are spaced along the seam 42, beneath the trim panels 44, 46. The clips 48 may be positioned between a door frame 50 of the door 30 and the first and second interior trim panels 44, 46, and may also conceivably be integrated with the trim panels 44, 46 and/or portions of the door frame 50. The plurality of retention clips 48 are positioned to couple with the opaque portion 24 of the carrier 20 along a longitudinal extent of the carrier 20, thereby retaining the light pipe 12 to the door 30 of the vehicle 26. The translucent portion 22 of the carrier 20 is positioned to be directed outward on the clips 48 to transmit light out through the seam 42 and away from the door frame 50, such that the transmitted light may be visible within the passenger compartment 32 of the vehicle 26 proximate the seam 42, including when the door 30 is in both the closed and open positions. Accordingly, the opaque portion 24 of the carrier 20 is positioned on the clips 48 to face inward to prevent light from emitting into the door 30 and towards the door frame 50, which may result in light leaking outward from unwanted portions of the door 30, such as between the second interior trim panel 46 and a third interior trim panel 52, among other edges of the first or second trim panels 44, 46. It is contemplated that the arrangement of the first, second, and third trim panels 44, 46, 52 may vary considerably in shape and configuration from those illustrated.

Figure 2:
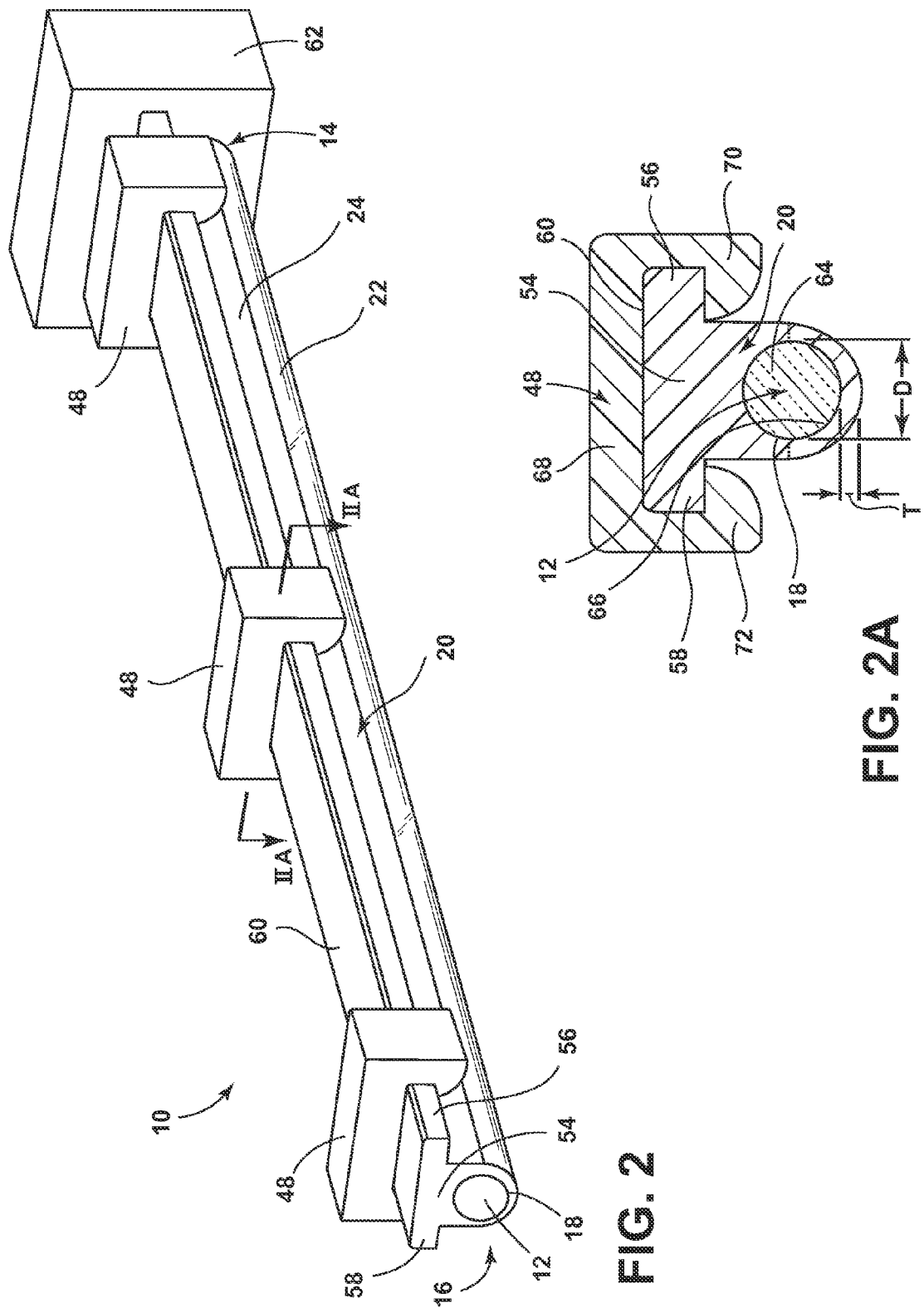
FIG. 2 is a top perspective view of the lighting apparatus, showing clips engaged with a carrier.

Referring now to FIG. 2, the lighting apparatus 10 is shown apart from the vehicle 26 (FIG. 1). The retention clips 48 that extend from an interior surface of the vehicle 26 are shown spaced along a longitudinal extent of the carrier 20 and engaged with the opaque portion 24 of the carrier 20. The opaque portion 24 includes a flange 54 protruding away from the light pipe 12 that extends within the carrier 20 to engage the retention clips 48. The flange 54 is positioned substantially tangential to the side surface 18 of the light pipe 12 and extends along a longitudinal extent of the carrier 20. The flange 54 includes a first lip 56 and a second lip 58 that each protrude laterally from opposing sides of the opaque portion 24 of the carrier 20 to define a generally planar surface 60. The flange 54 may conceivably include an alternatively shaped protrusion or indentation on the opaque portion 24 of the carrier 20 to engage a clip 48 or other retainer. It is also contemplated that more or fewer retention clips 48 may be included to accommodate the length and orientation of the carrier 20, as the segment of the lighting apparatus 10 is shown for illustration purposes and may be longer or shorter to accommodate the desired lighting location.

In the illustrated embodiment, the light pipe 12 is an optical fiber configured for side emitting light, as generally understood in the art. Yet, it is understood that the light pipe 12 may include other types of light pipes or light guides. The first end 14 of the lighting apparatus 10, as shown in FIG. 2, is coupled with a light source 62 configured to illuminate the optical fiber 12 by transmitting light through a core portion 64 (FIG. 2A) of the longitudinal extent of the optical fiber 12 and emitting light laterally from the side surface 18 at the desired the amount and type of illumination. As generally understood by one of ordinary skill in the art, illumination of the side surface 18 may be achieved by including various reflective angles, rough geometry, or other inefficiencies on an interface between the core portion 64 and an edge portion 66 (FIG. 2A) that surrounds the core portion 64 of the optical fiber 12, which in some instances includes or is referred to as a cladding-core interface. The light source 62 may include a quartz halogen lamp, a xenon metal halide lamp, an LED, or other light illuminators as generally known by one of ordinary skill in the art. It is also contemplated that a power source on the vehicle 26 may be coupled with the light source 62 for powering and operating the light source 62, although the light source 62 may be additionally or alternatively controlled by other devices.

As shown in the embodiment illustrated in FIG. 2A, the optical fiber 12 has a generally circular shaped cross section, whereby the side surface 18 is surrounded with the translucent portion 22 and the opaque portion 24 of the carrier 20. However, it is contemplated that other embodiments of the light pipe 12 may have other cross-sectional shapes, such as ovular, rectangular, or triangular shaped cross sections. Although the optical fiber 12 may be designed to have any general diameter, the diameter is typically in the range between 0.5-5 millimeters, and illustrated with about a 3 millimeter diameter D, according to one embodiment. The carrier 20, as shown in FIG. 2A, surrounds the optical fiber 12 in substantially abutting contact with the side surface 18 due to the extrusion process used in forming the carrier 20, as explained in more detail below. In the illustrated exemplary embodiment, the opaque portion 24 conceals approximately half of the circumferential side surface 18. It is also contemplated that other embodiments of the opaque portion 24 may conceal other proportions of the circumferential side surface 18 of the optical fiber 12, such as a third of the circumferential side surface 18 or two thirds of the circumferential side surface 18, as illustrated in an additional embodiment shown FIG. 5. It is further contemplated that the side surface 18 of may include a variety of shapes and curvatures. In addition, it is understood that the optical fiber 12 may conceivably include a plurality of fiber elements that extend though the carrier 20, a hollow light tube, or any other types of light pipes or light guides, as generally understood by one having ordinary skill in the art.

The translucent portion 22 of the carrier 20, as shown in FIGS. 2-2A, is extruded over the side surface 18 of the optical fiber 12 to have a consistent thickness T around the side surface 18, typically in the range between 0.1-3 millimeters, and illustrated with approximately a 0.5 millimeter thickness T. In the embodiment illustrated in FIGS. 2-2A, the translucent portion 22 is integrally connected with the opaque portion 24 on opposing lateral sides of optical fiber 12. The opaque portion 24 continues from the translucent portion 22 circumferentially around the side surface 18 of the optical fiber 12 and protrudes radially outward proximate the flange 54. The clip 48 includes a body portion 68 that directly abuts and extends laterally across the planar surface 60 of the flange 54. A first arm 70 and a second arm 72 extend in parallel alignment from the opposing ends of the body portion 68 of the clip 48 to engage the first and second lips 56, 58 of the flange 54, respectively. The first and second arms 70, 72 are arranged generally orthogonal to the body portion 68 of the clip. The clips 48 spaced longitudinally along the flange 54 and are configured to retain the flange 54 and thereby secure the optical fiber 12 to the vehicle 26.

Figure 3:
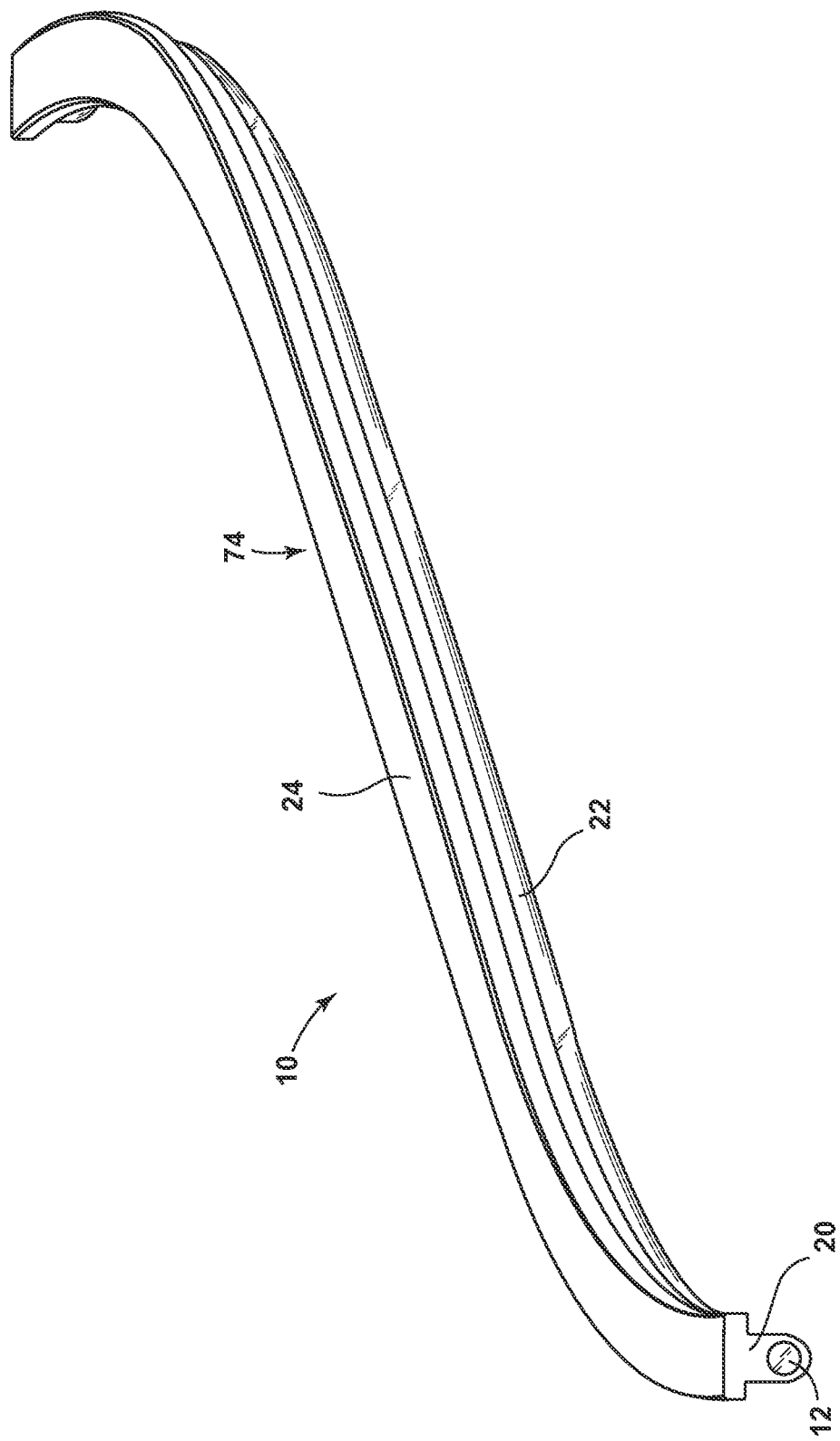
FIG. 3 is a top perspective view of the lighting apparatus in a curved orientation.

Referring now to FIG. 3, the optical fiber 12 is shown flexed to a curved orientation 74. To permit the optical fiber 12 to flex to the curved orientation 74, the optical fiber 12 contains a resilient material, such as a polymer, acrylic, glass, or combinations thereof and/or other materials as generally known by one of ordinary skill in the art for use in flexible side-glow fiber optic fibers. To accommodate the curved orientation 74 of the optical fiber 12, the carrier 20 is similarly comprised of a flexible material, such as an elastomer or a resilient polyurethane material. It is contemplated that the carrier 20 may be comprised of other flexible materials or a combination of flexible materials that may be extruded or otherwise disposed on the side surface 18 of the optical fiber 12 with an opaque portion 24 and a translucent portion 22, as described herein. The translucent portion 22 may be comprised of a color filter material, a translucent material with varying degrees of translucency, a substantially transparent material, or a combination of such materials that allow light to be transmitted from the optical fiber 12. The opaque portion 24 may be comprised of a black or substantially dark colored material or any combination of flexible materials that may be coextruded with the translucent portion 22 and substantially prevent light from being transmitted beyond the light emitting side surface 18 of the optical fiber 12. The flexibility of both the optical fiber 12 and the carrier 20 allow the lighting apparatus 10 to be installed in various orientations, such as seams between trim panels that have curvature and irregularities.

Figure 4:
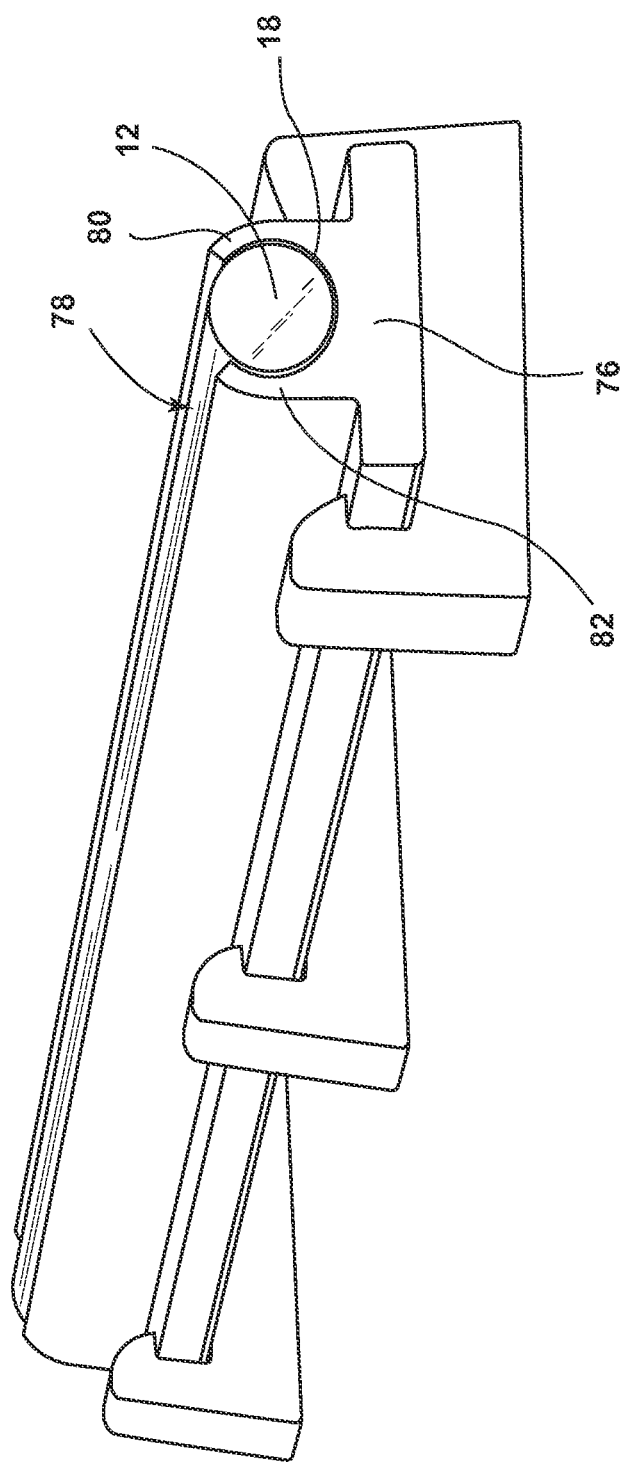
FIG. 4 is a top perspective view of an additional embodiment of the lighting apparatus, showing clips engaged with the carrier.

An additional embodiment of the lighting apparatus 10, as illustrated in FIG. 4, includes an opaque carrier 76 that is extruded along the longitudinal extent of the optical fiber 12. The illustrated embodiment of the opaque carrier 76 surrounds approximately two thirds of the circumferential side surface 18 of the optical fiber 12, leaving an exposed portion 78 of the optical fiber 12 for emitting light outward. The exposed portion 78 is defined by a space between ends of a first member 80 and a second member 82 of the opaque carrier 76. The first and second members 80, 82 retain the optical fiber 12 to the opaque carrier 76 by surrounding more than half of the circumferential side surface 18 of the optical fiber 12. However, it is contemplated that the opaque carrier 76 may surround less than half of the circumferential side surface 18 of the optical fiber 12 when additional retention means from the first and second members 80, 82 are used to retain the optical fiber 12 to the opaque carrier 76. It is also conceivable that the exposed portion 78 may be include a substantially linear opening, as illustrated, or a non-linear opening, such as a curved or wave shaped design.

With regard to a method of forming the lighting apparatus 10, an optical fiber 12 is provided that is configured to emitting light from the side surface 18 that is received from at least one of the first and second ends 14, 16. The carrier 20, in the embodiment shown in FIGS. 1-3, is extruded over the side surface 18 of the optical fiber 12 in a dual-extrusion process that forms the carrier 20 around the side surface 18 of the optical fiber 12 with the translucent portion 22 longitudinally extending along side the opaque portion 24. The opaque portion 24 is extruded with the flange 54 extending radially outward from optical fiber 12. Typically, the opaque portion 24 substantially conceals more than a third of the circumferential side surface 18 of the optical fiber 12 to prevent light from emitting beyond the concealed portion of the side surface 18. It is also contemplated that the optical fiber 12 may extend longitudinally beyond the carrier 20 to include one or more additional carriers extruded at various segments of the optical fiber 12.

Upon installation and assembly with the vehicle 26, the flange 54 on the opaque portion 24 of the carrier 20 is coupled to the clip 48 on a vehicle interior surface, such that the translucent portion 22 of the carrier 20 is directed to emit light outward to the passenger compartment 32 or other desired area of lighting. At least the first end of the optical fiber 12 is coupled with the light source 62 on the vehicle 26. The light source 62 is configured to illuminate the optical fiber 12, causing the translucent portion 22 of the carrier 20 to emit light from the light source 62 while the opaque portion 24 prevents light from emitting beyond the side surface 18 of the optical fiber 12, such as within the vehicle door 30 or underneath trim panels of the vehicle 26.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle lighting apparatus, comprising:
   a light source;
   a light pipe having a first end coupled with the light source, a second end, and a side surface extending between the first and second ends for radially emitting light;
   a carrier surrounding the side surface and comprising:
      an opaque portion abutting the side surface for preventing light from emitting beyond the side surface wherein the opaque portion includes a flange protruding from the carrier for engaging a vehicle; and
      a translucent portion adjacent to the opaque portion; and
   a clip extending from an interior surface of the vehicle that couples with the flange to retain the light pipe, wherein the flange includes a first lip and a second lip that protrude laterally from opposing sides of the opaque portion for operably engaging the clip.

2. The lighting apparatus of claim 1, wherein the light pipe includes an optical fiber, and wherein the translucent portion of the carrier transmits light from the side surface of the light pipe for lighting a vehicle interior.

3. The lighting apparatus of claim 1, further comprising:
a clip coupled with the opaque portion of the carrier for retaining the light pipe to a surface of a vehicle.

4. The lighting apparatus of claim 3, wherein the opaque portion wraps circumferentially over at least a third of the side surface of the light pipe.

5. The lighting apparatus of claim 1, further comprising:
a plurality of retention clips between a first interior trim panel and a second interior trim panel of the vehicle, wherein the plurality of retention clips are coupled with the opaque portion at spaced locations along a longitudinal extent of the carrier.

6. The lighting apparatus of claim 1, wherein the translucent portion comprises a first elastomer having translucent properties and the opaque portion comprises a second elastomer having opaque properties.

7. A vehicle lighting apparatus comprising:
an optical fiber having a side surface for emitting light;
an elastomeric carrier comprising:
an opaque portion extending along a first circumferential segment of the side surface and having a laterally protruding flange; and
a clip inside the vehicle that couples with and second lips of the flange, the lips protruding laterally from opposing sides of the opaque portion thereby securing the optical fiber inside the vehicle.

8. The vehicle lighting apparatus of claim 7, further comprising:
a retainer extending from the vehicle surface to couple with the flange, wherein the flange includes a first lip and a second lip that protrude laterally from opposing sides of the opaque portion for operably engaging the clip.

9. The vehicle lighting apparatus of claim 7, wherein the elastomeric carrier surrounds the side surface and further comprises a translucent portion adjacent to the opaque portion, and wherein the translucent portion comprises a first elastomer having translucent properties and the opaque portion comprises a second elastomer having opaque properties.

10. The vehicle lighting apparatus of claim 7, wherein the elastomeric carrier further comprises a translucent portion longitudinally extending along a second circumferential segment of the side surface adjacent to the opaque portion.

11. The vehicle lighting apparatus of claim 10, wherein the first and second circumferential segments surround the side surface of the optical fiber, and the first circumferential segment is larger than the second circumferential segment.

12. The vehicle lighting apparatus of claim 7, wherein the optical fiber is capable of flexing to a curved orientation, and wherein the elastomeric carrier comprises a polyurethane material that is substantially resilient to accommodate the curved orientation of the optical fiber.

13. The vehicle lighting apparatus of claim 7, wherein the optical fiber has a substantially circular cross section, and wherein the opaque portion substantially conceals more than a third of the side surface of the optical fiber.

14. A method of forming a lighting apparatus comprising:
providing a light pipe having a first end, a second end, and a side surface there between for emitting light received from at least one of the first and second ends;
extruding a carrier on the side surface, wherein the carrier includes a translucent portion and an opaque portion that are co-extruded adjacent each other around the side surface of the light pipe wherein the opaque portion includes a flange protruding from the carrier for engaging a vehicle; and
attaching a clip extending from an interior surface of the vehicle that couples with the flange to retain the light pipe, wherein the flange includes a first lip and a second lip that protrude laterally from opposing sides of the opaque portion for operably engaging the clip.

15. The method of claim 14, further comprising:
engaging the opaque portion of the carrier to a clip that is coupled with an interior surface of a vehicle, wherein the opaque portion prevents light from emitting toward the interior surface.

16. The method of claim 14, further comprising:
coupling the first end of the light pipe with a light source on a vehicle, wherein the translucent portion of the carrier is positioned to emit light from the light source to a passenger compartment of the vehicle.

17. The method of claim 14, wherein the light pipe includes an optical fiber that has a substantially circular cross section, and wherein the opaque portion substantially conceals more than a third of the circumferential side surface of the optical fiber.

18. The method of claim 14, wherein the translucent portion comprises a first elastomeric material having translucent properties and the opaque portion comprises a second elastomeric material having opaque properties, and wherein the first and second elastomeric materials are co-extruded around the side surface to integrally form the carrier.

* * * * *